(12) United States Patent
Lee (10) Patent No.: US 7,706,138 B2
(45) Date of Patent: Apr. 27, 2010

(54) HINGE AND STAND FOR DISPLAY DEVICE

(75) Inventor: Moon Hee Lee, Goomi-si (KR)

(73) Assignee: LG Electronics Inc., Seoul (KR)

( * ) Notice: Subject to any disclaimer, the term of this patent is extended or adjusted under 35 U.S.C. 154(b) by 208 days.

(21) Appl. No.: 11/483,545

(22) Filed: Jul. 11, 2006

(65) Prior Publication Data

US 2007/0097610 A1 May 3, 2007

(30) Foreign Application Priority Data

Nov. 2, 2005 (KR) .................... 10-2005-0104423

(51) Int. Cl.
*G06F 1/16* (2006.01)
(52) U.S. Cl. .................... 361/679.21; 248/226.11; 16/321; 345/649; 455/550.1
(58) Field of Classification Search ............... 361/681, 361/682, 679.06, 679.09, 679.27; 16/342, 16/337, 334, 321, 382; 248/214, 157, 226.11, 248/133, 205.1; 345/649; 455/575.3, 550.1
See application file for complete search history.

(56) References Cited

U.S. PATENT DOCUMENTS

| | | | | |
|---|---|---|---|---|
| 1,956,040 A * | 4/1934 | Meyer | ........................ | 16/340 |
| 4,960,256 A * | 10/1990 | Chihara et al. | ........... | 248/286.1 |
| 4,986,507 A | 1/1991 | Chiang | | |
| 5,195,213 A * | 3/1993 | Ohgami et al. | ................ | 16/342 |
| 5,333,356 A * | 8/1994 | Katagiri | ........................ | 16/340 |
| 5,638,579 A * | 6/1997 | Tenney | ........................ | 16/338 |
| 5,715,576 A * | 2/1998 | Liu | ............................. | 16/342 |
| 5,950,281 A * | 9/1999 | Lu | ............................... | 16/342 |
| 6,085,388 A * | 7/2000 | Kaneko | ........................ | 16/338 |
| 6,101,676 A * | 8/2000 | Wahl et al. | .................... | 16/342 |
| 6,775,884 B2 * | 8/2004 | Su-Man | ........................ | 16/342 |
| 7,177,144 B2 * | 2/2007 | Ha et al. | ..................... | 361/681 |
| 7,274,557 B2 * | 9/2007 | North et al. | ................. | 361/681 |
| 7,333,322 B2 * | 2/2008 | Hwang et al. | ................ | 361/681 |
| 2002/0174519 A1 * | 11/2002 | Huang | ........................ | 16/319 |

FOREIGN PATENT DOCUMENTS

| | | |
|---|---|---|
| EP | 0 965 786 A1 | 12/1999 |
| EP | 1 505 333 A2 | 2/2005 |
| WO | WO 95/16094 | 6/1995 |

OTHER PUBLICATIONS

European Search Report dated Dec. 3, 2007.
European Office Action dated Dec. 8, 2009.

* cited by examiner

*Primary Examiner*—Hung V Duong
(74) *Attorney, Agent, or Firm*—KED & Associates, LLP (57) ABSTRACT

Provided are a hinge and a stand for a display device. The hinge includes a rotary body fixed to a display device; a support fixed to a base; a key bracket inserted in the rotary body; a hole formed inside the key bracket; and a rotary shaft inserted to the hole and the support and being a rotation axis of the rotary body. Thus, the hinge and stand may be manufactured at low costs because a small number of components are used. Also, the hinge structure effectively stands against the external vibration because no screw is used during an assembling process, and forming an exterior of the hinge in itself eliminates need to use a separate component for the exterior, thereby reducing the manufacturing costs of the stand.

25 Claims, 6 Drawing Sheets

FIG.6 understand# HINGE AND STAND FOR DISPLAY DEVICE

BACKGROUND OF THE INVENTION

1. Field of the Invention

The present invention relates to a hinge structure, and more particularly, to a hinge structure including a small number of components, facilitating assembly thereof, and rotatably supporting a display device. Also, the present invention relates to a stand for a display device employing the aforementioned hinge structure.

2. Description of the Related Art

A stand is a structure used to support a display device on a predetermined plane. In general, such a stand includes a support coupled to a rear side of the display device, and a base placed on the bottom and connected to a lower side of the support to support the support.

Here, in general, the support coupled to the rear side of the display device is configured to rotate the display device vertically or horizontally for the user's convenience. In order to rotate the display device vertically or horizontally, the stand includes a hinge formed at an upper portion of the support, and the display device is coupled to one side of the hinge.

Here, the hinge includes a bracket made of metal and fixed to a rear side of the display device, another metal bracket fixed to the support, a shaft coupled between the two brackets to be a hinge shaft, and a screw fixing those components.

However, because the screw completes the assembly of the hinge formed by such coupling of the metal brackets, the screw may loosen due to the external shaking.

Also, the hinge including the metal brackets has a complicated assembly structure and requires a number of components.

In addition, in order to prevent the exposure of the hinge to the outside, a component for an exterior thereof is separately provided, which increases the number of components and costs.

SUMMARY OF THE INVENTION

Accordingly, the present invention is directed to a hinge and a stand for a display device that substantially obviates one or more problems due to limitations and disadvantages of the related art.

An object of the present invention is to provide a hinge and a stand for a display device, in which the hinge rotating the display device includes a small number of components.

Another object of the present invention is to provide a hinge and a stand for a display device capable of reducing the number of components by forming an exterior of the hinge with a component of the hinge itself without using a separate component for the exterior.

A further another object of the present invention is to provide a hinge and a stand for a display device capable of standing effectively against external shaking by not using a screw in assembling the hinge.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a hinge including: a rotary body fixed to a display device; a support fixed to a base; a key bracket inserted in the rotary body; a hole formed inside the key bracket; and a rotary shaft inserted to the hole and the support and being a rotation axis of the rotary body.

In another aspect of the present invention, there is provided a stand of a display device, including: a stand base; a support extending upward from the stand base; a rotary shaft inserted in the support; a key bracket in which one end of the rotary shaft is inserted; a rotary body in which the key bracket is inserted; and a display device supported by the rotary body in a state that the rotary body is fixed.

In a further another aspect of the present invention, there is provided a hinge including: a rotary body made of plastic and coupled to a display device; a base placed on the bottom; a support made of plastic and extending upward from the base; and a rotary shaft made of a stiff material, inserted in the rotary body and the support, and being a rotation axis of the rotary body.

In a still further another aspect of the present invention, there is provided a hinge including: a rotary body made of plastic and fixed to a display device; a support made of a plastic material; a key bracket made of metal and inserted in and supported by the rotary body; and a rotary shaft made of metal, inserted in the key bracket and the support, and being a rotation axis of the rotary body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
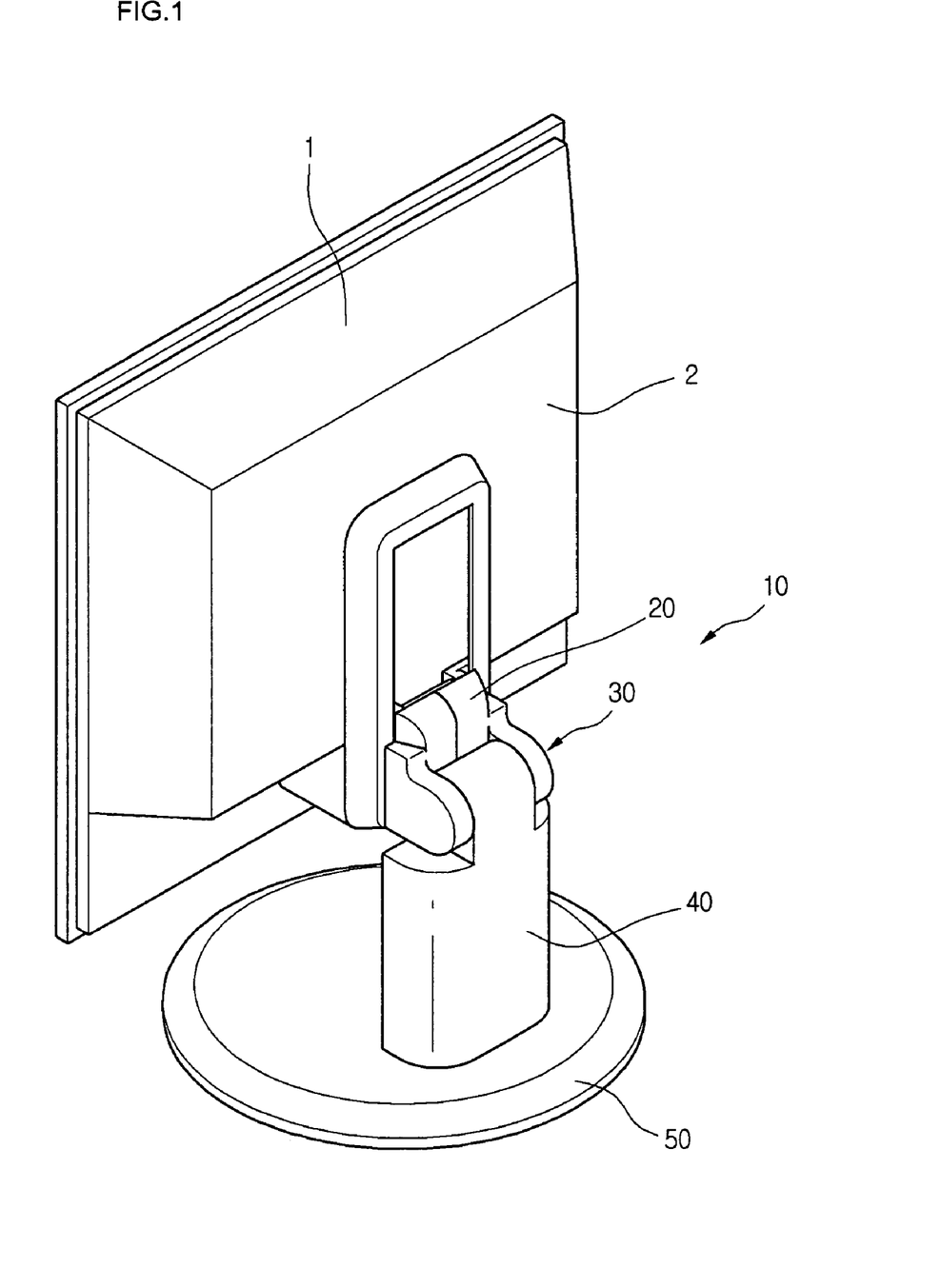
FIG. 1 is a perspective view of a stand using a hinge structure according to the present invention.

FIG. 1 is a rear perspective view of a stand employing a hinge structure according to the present invention.

Referring to FIG. 1, a stand 10 employing a hinge structure according to the present invention includes a rotary body 20 fixed to a rear side 2 of a display device 1, a hinge 30 rotatably supporting the rotary body 20, a support 40 supporting the hinge 30, and a base 50 supporting the support 40 with respect to the bottom.

In more detail, one side of the rotary body 20 is fixed to a lower portion of the rear side 2 of the display device.

The rotary body 20 includes one pair of corresponding members, and each of the members has one side fixed to the rear side 2 of the display device 1 and the other side fixed to the hinge 30.

The hinge 30 is formed such that one side of the rotary body 20 is rotatably coupled to an upper portion of the support 40 supporting the rotary body 20.

As for the support 40, an upper side thereof becomes a rotation axis of the hinge 30, and a lower side thereof extends downward from the hinge 30. Also, a lower end of the support 40 is coupled to the base 50 placed on the bottom.

Here, as one characteristic of the present invention, the rotary body 20 and the support 40 supporting the rotary body 20 may be formed of plastic. The forming of the rotary body 20 and the support 40 using plastic makes it possible to manufacture them simply using a mold. Thus, such a simple manufacturing process of the rotary body 20 and the support 40 using a mold contributes to remarkably reducing manufacturing costs of the rotary body and the support.

Also, the rotary body 20 and the support 40 respectively have one side and an upper side forming the hinge 30, and form a frame of the stand at the same time. Accordingly, a separate component for encompassing the hinge 30 is not needed. Therefore, such construction maximizes advantages: simplifying a manufacturing process of the stand, facilitating an assembling process, and lowering the price.

The hinge structure according to the present invention will now be described in more detail.

Figure 2:
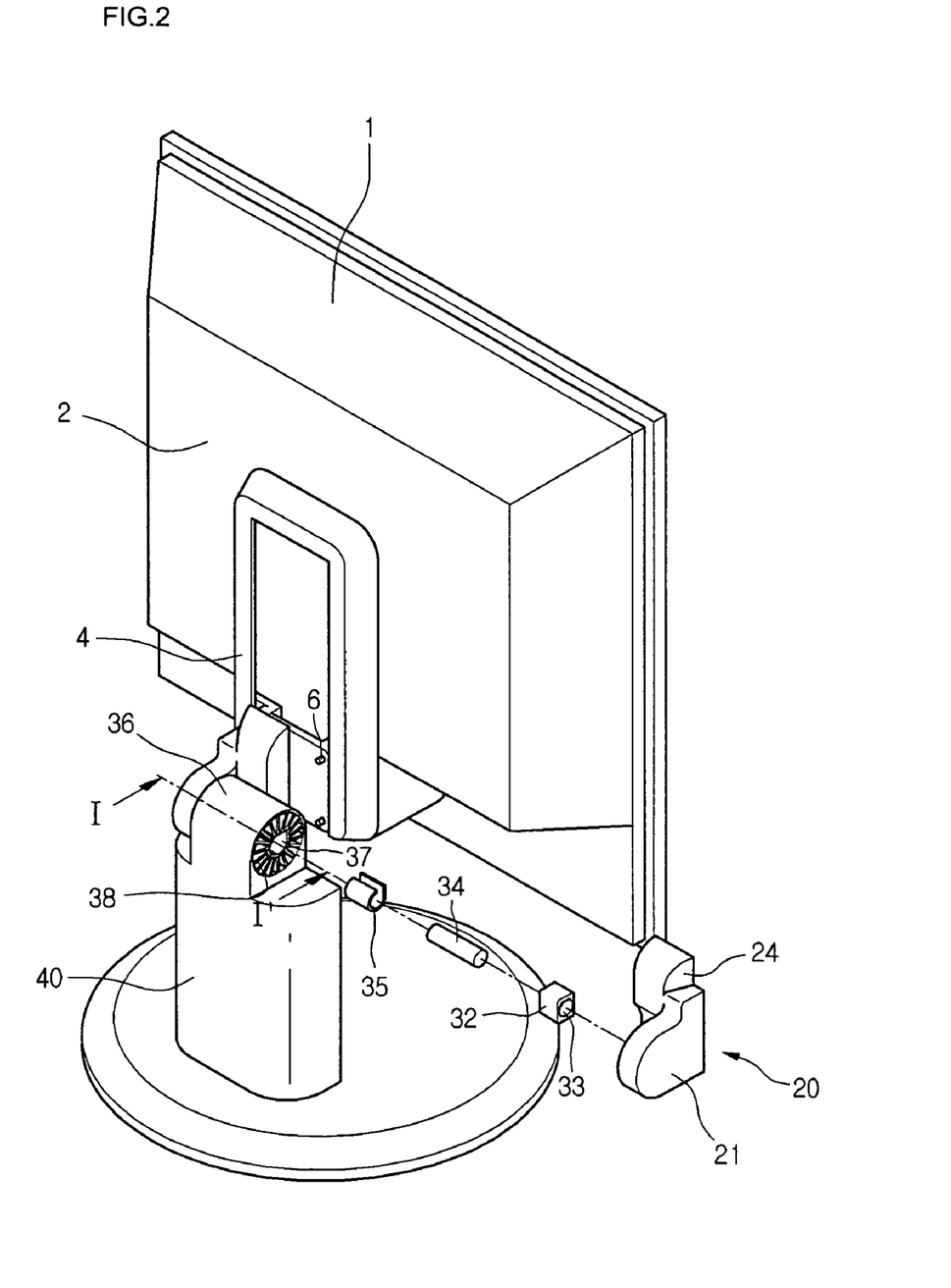
FIG. 2 is an exploded perspective view of a hinge structure according to the present invention.
Figure 3:
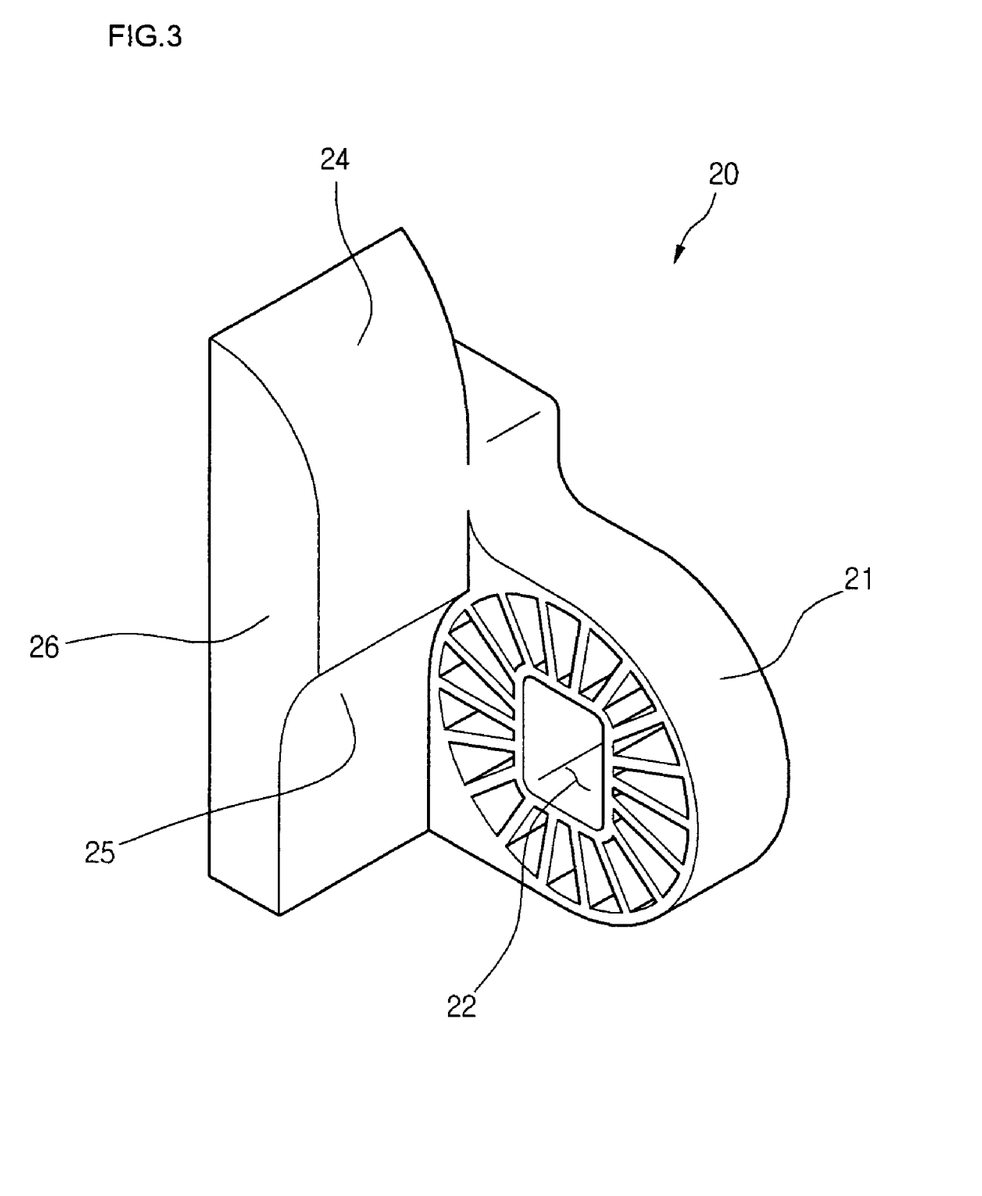
FIG. 3 is a front perspective view of a rotary body of a hinge structure according to the present invention.
Figure 4:
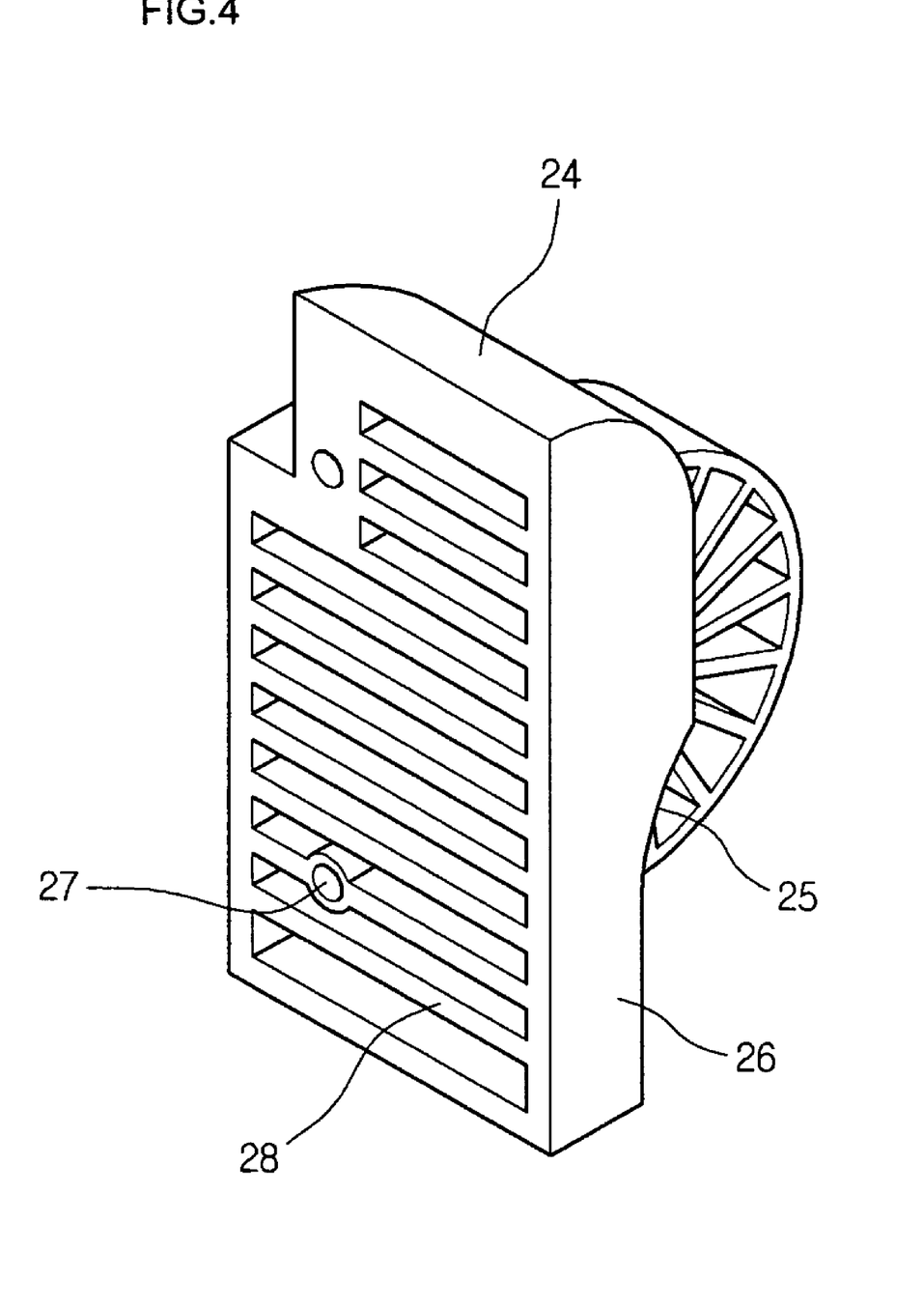
FIG. 4 is a rear perspective view of a rotary body of a hinge structure according to the present invention.

FIG. 2 is an exploded perspective view of the hinge of the stand according to the present invention, FIG. 3 is a perspective view of the rotary body used for the hinge according to the present invention, and FIG. 4 is a rear perspective view of the rotary body used for the hinge according to the present invention.

In FIG. 2, the rotary body 20 is formed in pair, and one of the pair is fixed to an upper side of the support 40, and the other one is exploded.

The pair of rotary bodies 20 has the same structure. Hereinafter, a structure of one rotary body will be described.

Referring to FIG. 2, the hinge 30 according to the present invention is formed by coupling between the rotary body 20 fixed to one side of the display device 1 and the support 40 rotatably supporting the rotary body 20.

First, a rotary-body coupling portion 4 to which one side of the rotary body 20 is coupled and fixed is provided at a lower portion of the rear side 2 of the display device 1. The rotary-body coupling portion 4 includes at least one coupling portion 6 that is protrudingly formed. The rotary-body coupling portion 4 may be formed as a component having another function, which is coupled to the rear side 2 of the display device 1. For example, the rotary-body coupling part may be a height control structure controlling the height of the display device or a hinge swiveling or pivoting the display device, thereby operating the display device together with the hinge according to the present invention.

Of course, the rotary-body coupling portion 4 may not be separately formed and instead, the coupling portion 6 may be formed directly on the rear side of the display device.

Even though the coupling portion is integrally formed on the rear side of the display device in the present embodiment, a coupling member such as a screw may couple the display device with the rotary body.

Also, even though the rotary body is directly fixed onto the rear side of the display device in the present embodiment, the rotary body may not be fixed directly onto the rear side of the display device but be fixed to another structure fixed to the rear side of the display device to thereby support the display device.

Referring to FIGS. 3 and 4, the rotary body 20 includes a rear fixing portion 24 fixed to the rear side 2 of the display device 1, and a rotary-shaft fixing portion 21 formed on the rear fixing portion 24 and coupled to a rotary shaft 34.

A coupling member receiving portion 27 coupled to the coupling portion 6 formed on the rear side 2 of the display device 1 is formed on the bottom of the rear fixing portion 24.

When molded by a mold, the rear fixing portion 24 is formed to be hollow. Here, in order to reinforce the support strength of the rear fixing portion 24, a support rib 28 may be formed inside the rear fixing portion 24.

The construction of making the rear fixing portion 24 hollow and forming the support rib 28 therein is the preferred embodiment according to the present invention. This is because the hinge structure according to the present invention is formed by plastic molding, and the structure of the rotary body would be modified in various manners.

In FIG. 2, the rotary-shaft fixing portion 21 is formed outside the rear fixing portion 24 on the basis of the center of the rear side of the display device. Referring to FIG. 3, a key bracket receiving groove 22 is formed inside the rotary-shaft fixing portion 21.

The key bracket receiving groove 22 has a rectangular sectional shape, and a key bracket 32 to which a rotary shaft 34 to be described later is fixed is inserted in and fixed to the key bracket receiving groove 22.

A circular arc portion 25 is formed at a lower side of an outer circumferential surface of the rotary-shaft fixing portion 21. The circular arc portion 25 is formed to prevent the rotary body 20 from colliding with the center of the support 40 when the rotary body 20 rotates about the support 40.

A side portion 26 is provided inside the rotary-shaft fixing portion 21. When a pair of rotary-shaft fixing portions 21 are coupled to both ends of the rotary shaft 34, their side portions 26 come in contact with each other.

Referring to FIG. 2 again, the rotary body 20 is connected to the support 40 by the rotary shaft 34. The rotary shaft 34 is connected to the rotary body 20 by the key bracket 32. The key bracket 32 may be made of a metallic material.

The key bracket 32 is insertedly coupled to the key bracket receiving groove 22 of the rotary shaft fixing portion 21.

The rotary shaft 34 is coupled to a rotary shaft hole 33 formed at the center of the key bracket 32. Here, the rotary shaft 34 may be coupled to the key bracket 32 to be integrally rotated with the key bracket 32. Accordingly, when the rotary body 20 is rotated, the rotary shaft 34 is rotated together therewith.

About an outer half of the entire rotary shaft 34 is coupled to the key bracket 32, and the remaining inner half thereof is coupled to the support 40 to be described later.

The inner half of the rotary shaft 34 is inserted in a friction spring 35, and the friction spring 35 is inserted in a rotary shaft receiving hole 37 of a rotary shaft receiving portion 36 formed at an upper portion of the support 40. Accordingly, the rotary shaft 34 is coupled to be rotatable within the rotary shaft receiving portion 36.

A frictional force between the rotary shaft 34 and the friction spring 35 provides a support force to support the weight of the display device 1 coupled to the rotary body.

The rotary shaft receiving hole 37 is formed at the center of the rotary shaft receiving portion 36 formed at an upper portion of the support 40. The rotary shaft receiving portion 36 has an upper end having a circular arc shape, and also has therein a rib-shaped receiving hole support portion 38 formed along a circumferential surface of the rotary shaft receiving hole 37 in a radial direction thereof and supporting the rotary shaft receiving hole 37.

Figure 5:
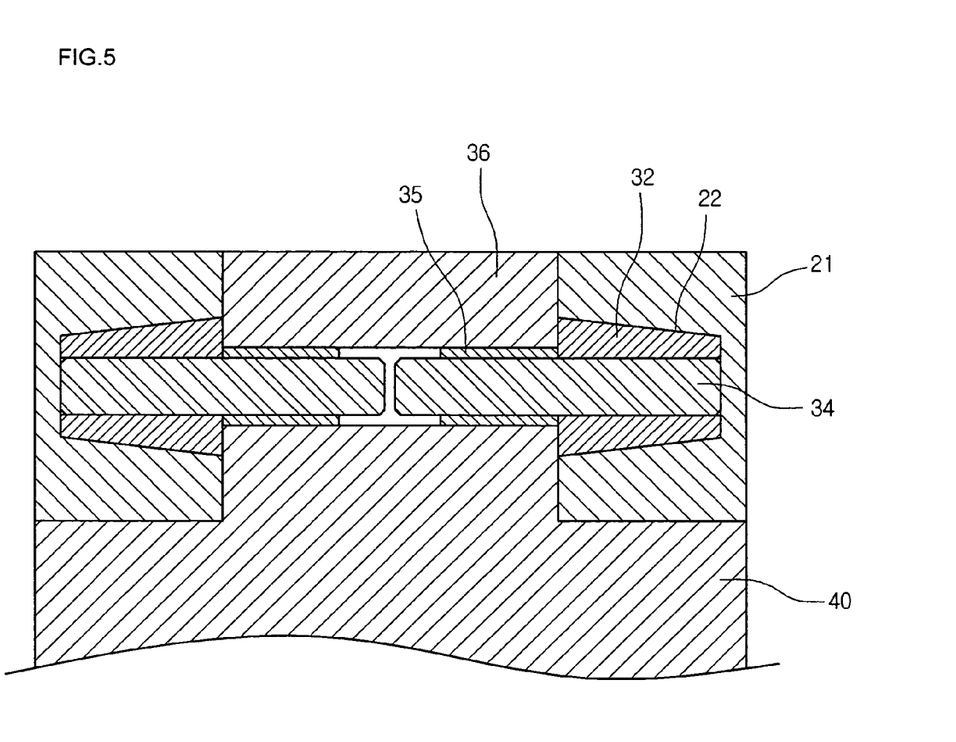
FIG. 5 is a cross-sectional view of a hinge structure in a coupled state according to the present invention.

FIG. 5 is a cross-sectional view illustrating that the rotary body 20 and the support 40 having the aforementioned structures are coupled to each other.

Referring to FIG. 5, to be inserted in the rotary shaft fixing portion 21 formed of a plastic material, the key bracket 32 of a metallic material is formed such that its side facing the rotary shaft fixing portion 21 is smaller than the key bracket receiving groove 22 of the rotary shaft fixing portion 21 and the opposite side is greater than the key bracket receiving groove 22 of the rotary shaft fixing portion.

In other words, as illustrated in FIG. 5, the section of the key bracket 32 is formed in a trapezoid shape whose right side is shorter than the left side. In FIG. 5, the length difference is exaggerated for clarity.

Because of the shape of the key bracket 32, the metallic key bracket 32 is easily inserted in the rotary shaft fixing portion 21 of plastic and then is firmly coupled thereto. Also, after the key bracket 32 is forcedly inserted in the rotary shaft fixing portion 21, the shaking is advantageously prevented.

Because the rotary shaft 34 is rotated integrally with the key bracket 32, the rotary shaft 34 is rotated together when the rotary body is rotated 20. In order to allow the rotary shaft 34 to be rotated in a state of being inserted in the key bracket 32, a separation or key or rib, or the like may be interposed between the outer surface of the rotary shaft 34 and the inner surface of the key bracket 32, in other words, on a contact surface of both members. In another case, both members can fix rotation of each other by forcible insertion.

Accordingly, when a user tilts (i.e., rotates) the display device 1 vertically, the rotary body 20 is rotated, and the rotary shaft 34 is rotated together with the rotary body 20.

As the rotary shaft 34 is rotated, the display device 1 is rotated. When the rotary shaft 34 stops rotating, a friction force between the rotary shaft 34 and the friction spring 35 inserted in the rotary shaft receiving portion 36 of the support serves to support the display device.

According to the preferred embodiment of the present invention, both ends of the rotary shaft 34 illustrated in FIG. 2 are coupled to the rotary bodies 34 by the key brackets 32. However, the rotary shaft 34 can operate the hinge even if the rotary shaft 34 is rotatably formed at only one of the rotary bodies 20.

However, if the rotary shaft is coupled at only one of the rotary bodies, the rotary shaft may be formed long as compared to the aforementioned embodiment.

As described so far, the hinge structure according to the present invention is formed by processes: coupling a metallic key bracket 32 to the plastic rotary body 20 coupled to the display device, then coupling the rotary shaft 34 to the key bracket 32, and rotatably coupling the rotary shaft 34 to an upper portion of the support formed of plastic.

Here, the friction spring 35 is interposed between the rotary shaft 34 and the upper portion of the support 40, thereby generating a predetermined frictional force between the rotary shaft 34 and the support 40.

In the hinge structure, the coupling between the rotary body and the support is made by the key bracket. For this reason, a separate screw for coupling of the rotary shaft is not needed.

Also, the entire hinge structure according to the present invention only includes the rotary body and the support molded by molding, the key bracket, the rotary shaft and the friction spring. For this reason, the hinge structure may be formed with only a very small number of components.

In addition, because a small number of components are used, the hinge structure may be assembled in a simple manner.

Figure 6:
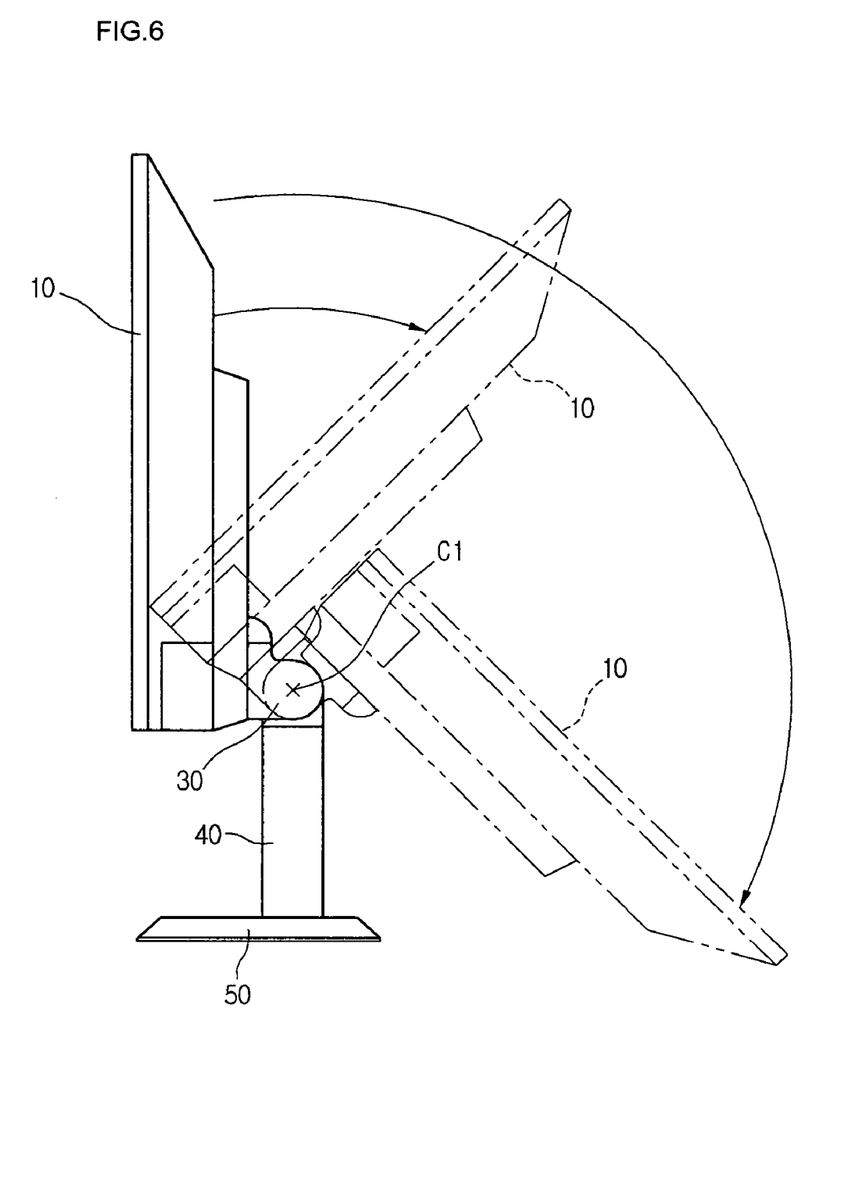
FIG. 6 is a side view illustrating an operation of a stand employing a hinge structure according to the present invention.

In FIG. 6, the display device tilts (i.e., rotates) about the support because of the hinge structure formed in the aforementioned manner.

Referring to FIG. 6, the stand employing the hinge structure according to the present invention includes the hinge at an upper end of the support, so that when a screen thereof faces the front side, the display device may rotate toward the rear side to 90° degrees or more about the rotary center C1.

A hinge and stand for a display device formed in the aforementioned manner may be manufactured at low costs because a small number of components are used.

Also, the hinge structure stands against the external vibration effectively because no screw is used in an assembling process. In addition, because the hinge itself forms its exterior, a separate component forming an exterior is not used, thereby reducing the manufacturing costs of the stand.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A hinge for a display device, comprising:
   a rotary body configured to be fixed to a display device;
   a support fixed to a base;
   a key bracket inserted in the rotary body, the key bracket having a hole formed therein; and
   a rotary shaft having a first end fixed the hole in the key bracket, and a second end rotatably coupled to a receiving portion formed at an upper end of the support so as to rotatably couple the support and the rotary body such that the rotary shaft defines a rotation axis of the rotary body, wherein a diameter of the key bracket is gradually increased from an innermost end thereof that is inserted into the rotary body to an outermost end thereof that faces the receiving portion of the support, wherein an upper end of the receiving portion has a circular arc shape, and the rotary body has a circular arc portion that faces the upper end of the receiving portion, wherein a shape of the circular arc portion of the rotary body corresponds to the circular arc shape of the upper end of the receiving portion so as to allow for rotation of the rotary body relative to the support.

2. The hinge according to claim 1, wherein the rotary body is plastic-molded and is configured to be fixed to the display device as a separate component.

3. The binge according to claim 1, wherein the support is plastic-molded.

4. The hinge according to claim 1, further comprising a friction spring positioned in the receiving portion of the support, at a contact surface between the rotary shaft and the support.

5. The hinge according to claim 1, wherein the key bracket is formed of a material that is stiffer than that of the rotary body.

6. The hinge according to claim 1, wherein the key bracket is rotated together with the rotary shaft.

7. The hinge according to claim 1, wherein the support is formed integrally with the base.

8. The hinge according to claim 1, wherein the rotary body comprises a pair of rotary bodies, with a first of the pair of rotary bodies positioned on a first side of the support, and a second of the pair of rotary bodies positioned on a second side of the support.

9. The hinge according to claim 1, wherein the circular arc portion of the rotary body is configured to come into contact with the support at a predetermined point as the rotary body rotates relative to the support so as to limit a rotation angle of the display device.

10. The hinge according to claim 1, further comprising a key bracket receiving groove formed in the rotary body, wherein the key bracket receiving groove receives the key bracket therein and fixes the key bracket in the rotary body, wherein a cross sectional shape of the key bracket receiving groove taken along an axis perpendicular to the rotary shaft corresponds to a cross sectional shape of the key bracket taken along an axis perpendicular to the rotary shaft.

11. The hinge according to claim 10, wherein the cross sectional shape of the key bracket receiving groove taken along an axis perpendicular to the rotary shaft is rectangular.

12. The hinge according to claim 1, wherein a cross sectional shape of the key bracket taken corresponding to a longitudinal axis of the rotary shaft has a trapezoidal shape.

13. The hinge according to claim 1, wherein the circular arc portion of the rotary body surrounds only a portion of an outer circumferential surface of the upper end of the receiving portion of the support.

14. The hinge according to claim 13, wherein the circular arc portion of the rotary body moves along the outer circumferential surface of the upper end of the receiving portion of the support as the rotary body rotates relative to the support.

15. The hinge according to claim 1, wherein the rotary body comprises:
   a rear fixing portion including a coupling portion provided on a rear side thereof, wherein the rear fixing portion is configured to be coupled to the display device by the coupling portion, wherein the circular arc portion is formed on a lower portion of a front side of the rear fixing portion opposite the rear side thereof; and
   a rotary shaft fixing portion formed at one lateral side of the rear fixing portion, wherein the key bracket is inserted into a key bracket receiving groove formed in the rotary shaft fixing portion.

16. The hinge according to claim 15, wherein the rotary body further comprises:
   a first plurality of support ribs that extend radially outward from an outer circumference of the key bracket receiving groove to an outer periphery of the rotary shaft fixing portion so as to reinforce the rotary shaft fixing portion; and
   a second plurality of support ribs provided on the rear side of the rear fixing portion so as to reinforce the rear fixing portion.

17. A stand of a display device, comprising:
   a stand base;
   a support extending upward from the stand base and having an upper end thereof formed in a circular arc shape;
   a rotary shaft having a first end thereof inserted in the support;
   a key bracket that receives a second end of the rotary shaft therein; and
   a rotary body into which the key bracket is inserted, wherein the rotary body is configured to be fixed to a display such that the display is supported by the rotary body, and wherein the rotary body includes a circular arc portion that faces the upper end of the receiving portion, the circular arc portion of the rotary body having a circular arc shape that corresponds to the circular arc shape of the upper the upper end of the receiving portion so as to allow for rotation of the rotary body relative to the support, wherein a cross section of the key bracket taken along a longitudinal axis of the rotary shaft has a trapezoidal shape such that a diameter of the key bracket is gradually increased from at an innermost end thereof that is inserted in the rotary body to an outermost end thereof that is positioned at an outer edge of the rotary body.

18. The stand according to claim 17, wherein the rotary body and/or support are/is plastic-molded.

19. The stand according to claim 17, further comprising a friction spring positioned at a contact surface between the rotary shaft and the support.

20. The stand according to claim 17, wherein the rotary body is configured to be fixed to a lower portion of a rear side of the display.

21. The stand according to claim 17, wherein the key bracket is formed of a material that is stiffer than that of the rotary body.

22. The stand according to claim 17, wherein the key bracket is rotated integrally with the rotary shaft.

23. The stand according to claim 17, wherein a forward rotation of the display relative to the support is restricted by contact between a front surface of the support and a rear surface of the rotary body.

24. A hinge, comprising:
   a rotary body made of plastic and configured to be coupled to a display and to a receiving portion formed at an upper end of a support that is made of plastic and extends upward from a base;
   a key bracket made of metal and inserted into and supported by the rotary body; and
   a rotary shaft made of a stiff material, wherein the rotary shaft has a first end inserted in the key bracket, and a second end inserted in the support such that the rotary shaft defines a rotation axis of the rotary body, and wherein a cross section of the key bracket taken along a longitudinal axis of the rotary shaft has a trapezoidal shape such that a diameter of the key bracket is gradually increased from at an innermost end thereof that is inserted in the rotary body to an outermost end thereof that is positioned at an outer edge of the rotary body, wherein an upper end of the receiving portion has a circular arc shape, and the rotary body has a circular arc portion that faces the upper end of the receiving portion, wherein the circular arc portion of the rotary body has a circular arc shape that corresponds to the circular arc shape of the upper end of the receiving portion so as to allow for rotation of the rotary body relative to the support.

25. The hinge according to claim 24, wherein the rotary shaft is made of metal.

* * * * *